United States Patent
Nashizawa

(10) Patent No.: US 9,357,138 B2
(45) Date of Patent: May 31, 2016

(54) IMAGE CAPTURE APPARATUS, METHOD OF CONTROLLING IMAGE CAPTURE APPARATUS, AND ELECTRONIC DEVICE

(71) Applicant: CANON KABUSHIKI KAISHA, Tokyo (JP)

(72) Inventor: Hiroaki Nashizawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 13 days.

(21) Appl. No.: 13/943,594

(22) Filed: Jul. 16, 2013

(65) Prior Publication Data

US 2014/0022408 A1    Jan. 23, 2014

(30) Foreign Application Priority Data

Jul. 20, 2012 (JP) ................................ 2012-161966

(51) Int. Cl.
*H04N 5/235* (2006.01)

(52) U.S. Cl.
CPC ........... *H04N 5/2355* (2013.01); *H04N 5/2352* (2013.01); *H04N 5/2356* (2013.01)

(58) Field of Classification Search
CPC .............................. H04N 5/235–5/243; G03B 2207/00–2207/005; G03B 7/00–7/28; G06T 2207/20208; G06T 5/007–5/009
USPC ............ 348/221.1, 222.1, 239, 362; 382/274, 382/294
See application file for complete search history.

(56) References Cited

U.S. PATENT DOCUMENTS

| | | | |
|---|---|---|---|
| 5,194,960 A | 3/1993 | Ota | |
| 2002/0145674 A1* | 10/2002 | Nakamura | ................... 348/296 |
| 2003/0095192 A1* | 5/2003 | Horiuchi | ................ H04N 5/235 |
| | | | 348/222.1 |
| 2008/0231730 A1* | 9/2008 | Tsuruoka | ................... 348/229.1 |
| 2009/0027545 A1* | 1/2009 | Yeo et al. | ..................... 348/362 |

FOREIGN PATENT DOCUMENTS

| | | |
|---|---|---|
| CN | 1799057 | 7/2006 |
| JP | H08-201873 A | 8/1996 |
| JP | 2002-223387 A | 8/2002 |
| JP | 2010-183461 A | 8/2010 |
| JP | 4554094 B | 9/2010 |

(Continued)

OTHER PUBLICATIONS

The above foreign patent document was cited in the Jun. 10, 2015 Taiwanese Office Action, which is enclosed without an English Translation, that issued in Taiwanese Patent Application No. 102124922.

(Continued)

*Primary Examiner* — Lin Ye
*Assistant Examiner* — Chriss Yoder, III
(74) *Attorney, Agent, or Firm* — Cowan, Liebowitz & Latman, P.C.

(57) ABSTRACT

An image capture apparatus is provided that is capable of accurately determining exposure conditions of multiple images to be used in high dynamic range compositing in a short duration, based on a captured image. A scene dynamic range is computed based on luminance information obtained from an image captured with a standard exposure according to a luminance zone to be prioritized in high dynamic range shooting and luminance information obtained from an image captured with an over-exposure or an under-exposure relative to the standard exposure. An exposure range of multiple images for creating a high dynamic range image is determined according to the computed dynamic range.

17 Claims, 15 Drawing Sheets

(56) References Cited

FOREIGN PATENT DOCUMENTS

| TW | I353774 B | 12/2011 |
| TW | I354198 B | 12/2011 |
| TW | I354490 B | 12/2011 |
| TW | I355188 B | 12/2011 |

OTHER PUBLICATIONS

The above references were cited in a Oct. 13, 2015 Korean Office Action, which is enclosed without an English Translation, that issued in Korean Patent Application No. 10-2013-0081345.

The above references were cited in a Apr. 5, 2016 Chinese Office Action, of which is enclosed without an English Translation, that issued in Chinese Patent Application No. 201310305935.6.

\* cited by examiner

FIG. 2A

| 11 | 12 | 13 | 14 | 15 | 16 | 17 | 18 | 19 | Y1 |
|----|----|----|----|----|----|----|----|----|----|
| 21 | 22 | 23 | 24 | 25 | 26 | 27 | 28 | 29 | Y2 |
| 31 | 32 | 33 | 34 | 35 | 36 | 37 | 38 | 39 | Y3 |
| 41 | 42 | 43 | 44 | 45 | 46 | 47 | 48 | 49 | Y4 |
| 51 | 52 | 53 | 54 | 55 | 56 | 57 | 58 | 59 | Y5 |
| 61 | 62 | 63 | 64 | 65 | 66 | 67 | 68 | 69 | Y6 |
| 71 | 72 | 73 | 74 | 75 | 76 | 77 | 78 | 79 | Y7 |
| X1 | X2 | X3 | X4 | X5 | X6 | X7 | X8 | X9 |    |

FIG. 2B

| 11 | 12 | 13 | 14 | 15 | 16 | 17 | 18 | 19 | Y1 |
|----|----|----|----|----|----|----|----|----|----|
| 21 | 22 | 23 | 24 | 25 | 26 | 27 | 28 | 29 | Y2 |
| 31 | 32 | 33 | 34 | 35 | 36 | 37 | 38 | 39 | Y3 |
| 41 | 42 | 43 | 44 | 45 | 46 | 47 | 48 | 49 | Y4 |
| 51 | 52 | 53 | 54 | 55 | 56 | 57 | 58 | 59 | Y5 |
| 61 | 62 | 63 | 64 | 65 | 66 | 67 | 68 | 69 | Y6 |
| 71 | 72 | 73 | 74 | 75 | 76 | 77 | 78 | 79 | Y7 |
| X1 | X2 | X3 | X4 | X5 | X6 | X7 | X8 | X9 |    |

FIG. 6

| 1 | 1 | 1 | 1 | 2 | 1 | 1 | 1 | 1 |
|---|---|---|---|---|---|---|---|---|
| 1 | 1 | 1 | 2 | 4 | 2 | 1 | 1 | 1 |
| 1 | 1 | 2 | 4 | 8 | 4 | 2 | 1 | 1 |
| 1 | 2 | 4 | 8 | 12 | 8 | 4 | 2 | 1 |
| 1 | 1 | 2 | 4 | 8 | 4 | 2 | 1 | 1 |
| 1 | 1 | 1 | 2 | 4 | 2 | 1 | 1 | 1 |
| 1 | 1 | 1 | 1 | 2 | 1 | 1 | 1 | 1 |

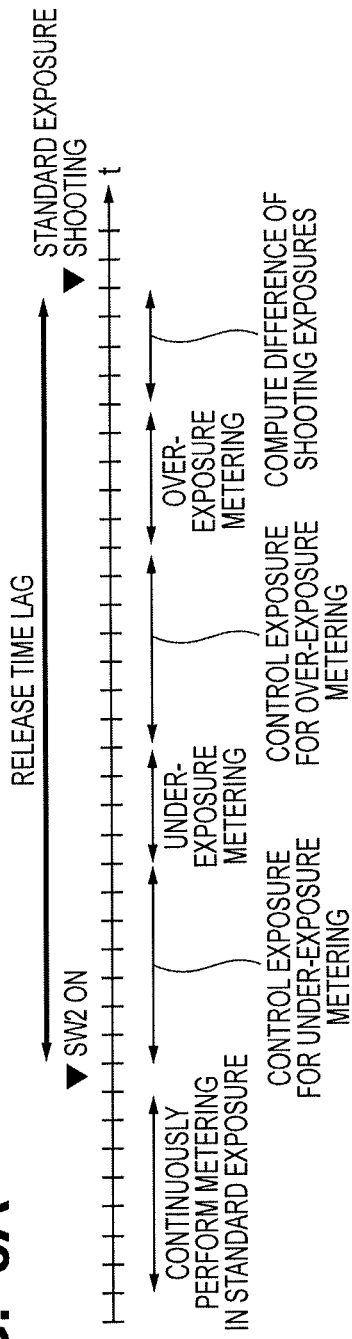
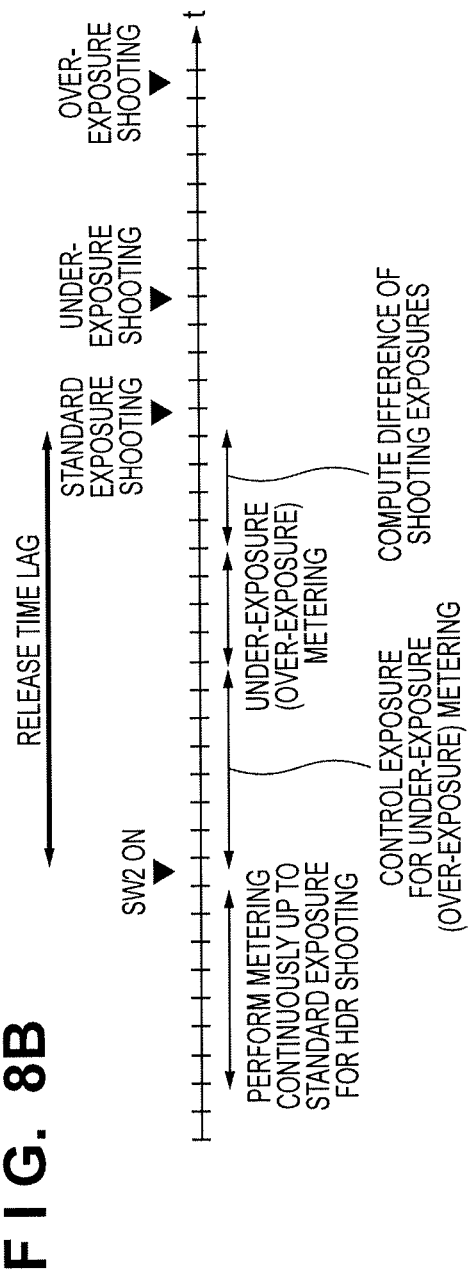
FIG. 8A
FIG. 8B

F I G. 9
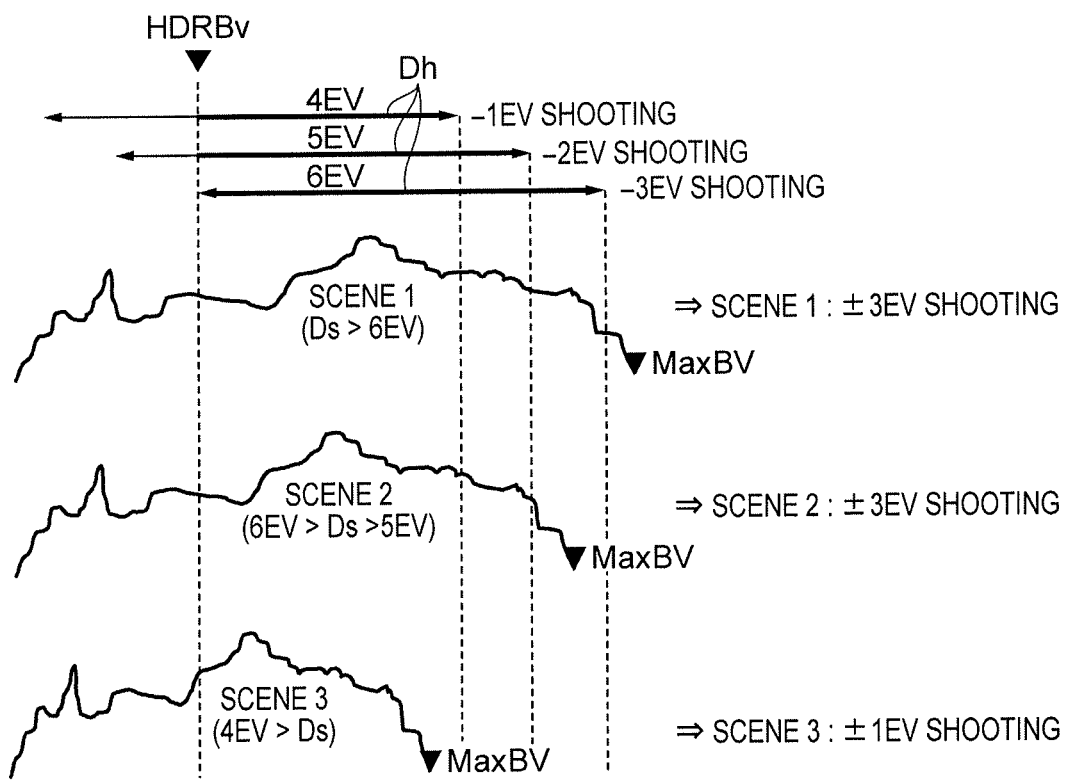

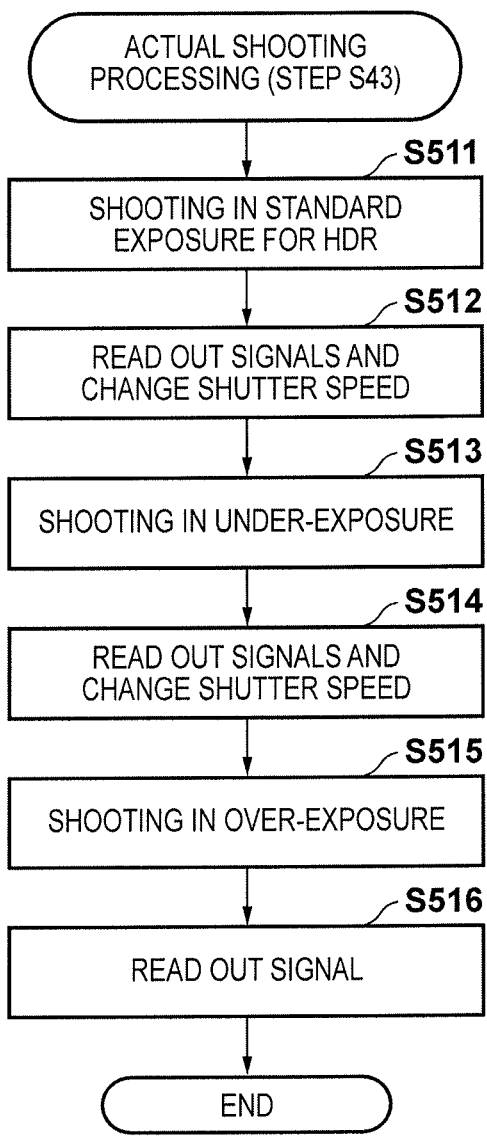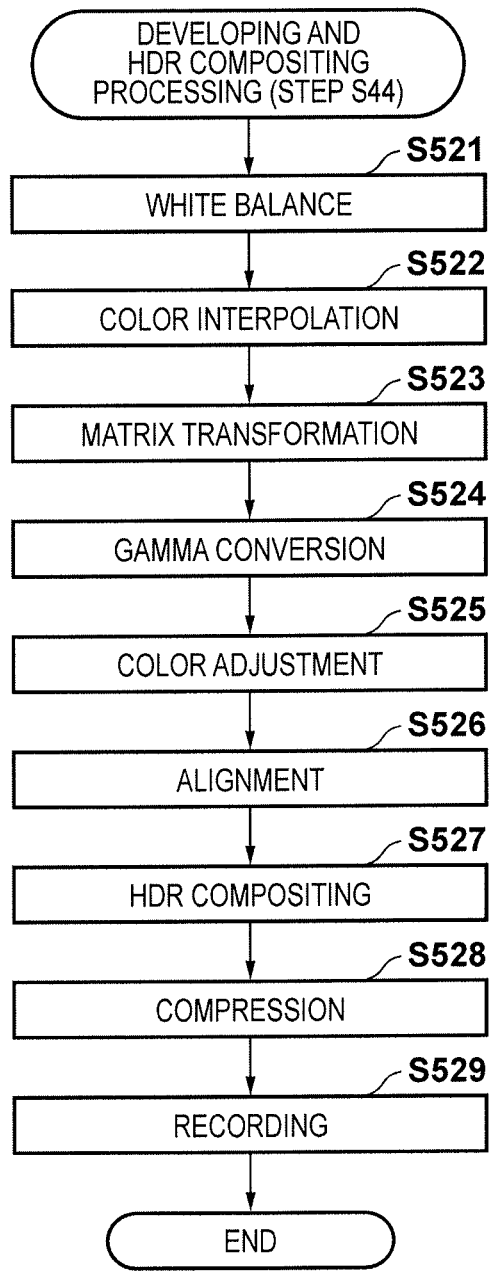

IMAGE CAPTURE APPARATUS, METHOD OF CONTROLLING IMAGE CAPTURE APPARATUS, AND ELECTRONIC DEVICE

BACKGROUND OF THE INVENTION

1. Field of the Invention

The present invention relates to an image capture apparatus, a method of controlling an image capture apparatus, and an electronic device. The present invention relates in particular to an image capture apparatus capable of shooting images (high dynamic range shooting) for creating a high dynamic range image, and to a method of controlling such an image capture apparatus, and an electronic device comprising or connected to such an image capture apparatus.

2. Description of the Related Art

High dynamic range (HDR) compositing is known in which multiple images captured with different exposure amounts (typically, standard exposure, under-exposure, and over-exposure) are composited to expand the dynamic range of an image. By compositing the standard exposure portions in the images, blown-out highlights and blocked-up shadows can be suppressed, and an image having a favorable tonal gradation from the dark portion to the bright portion can be obtained.

The dynamic range that can be realized by HDR compositing depends on the exposure conditions of the multiple images. For example, regarding a scene that has a wide dynamic range including a blue sky on a clear day as well as shadows of buildings and the like, an image in which the dynamic range of the scene is sufficiently reproduced cannot be obtained unless images are shot with an increased difference between the exposure amount in under-exposure and the exposure amount in over-exposure. On the other hand, with a scene on a cloudy day outside, the difference between the exposure amount in under-exposure and the exposure amount in over-exposure does not need to be significantly increased. Rather, when the exposure amount is set too high, there are cases where picture quality degradation such as S/N deterioration occurs since areas that are only slightly blown-out in standard exposure are compensated for more than necessary with under-exposure image signals that are not blown-out (quite dark), for example.

Thus, it is desirable that the difference between the exposure amount in under-exposure and the exposure amount in over-exposure (exposure range) are determined according to the scene dynamic range. Conventionally, there is a method in which a user manually selects this difference in exposure amounts out of ±1 EV, ±2 EV, and ±3 EV during shooting for HDR compositing, and also a method in which the difference in exposure amounts is automatically determined and set by the camera. For the latter method, it is common to use a method of determining the difference in exposure amounts based on scene dynamic range information acquired with an AE sensor having a wide metering field.

However, with light and compact camera systems such as so-called compact cameras and cameras built into portable devices and the like, it is necessary to acquire scene dynamic range information with another method since it is not necessarily the case that an AE sensor is built into those camera systems.

Japanese Patent Laid-Open No. 2010-183461 discloses that the dynamic range expansion amount is determined such that the amount of blown-out highlights is reduced, based on the amount of blown-out highlights in an image captured in standard exposure.

Additionally, in Japanese Patent No. 4554094, the degree of blocked-up shadows in the dark portions and the degree of blown-out highlights in the bright portions are analyzed based on a luminance histogram of an image captured in standard exposure. Also, a method is disclosed in which exposure conditions corresponding to the scene dynamic range are determined by repeating the shooting operation while changing the exposure conditions until the blocked-up shadows and blown-out highlights reach an allowable level.

With the method disclosed in Japanese Patent Laid-Open No. 2010-183461, the amount of blown-out highlights in the picture is an estimated value, and therefore, accuracy decreases in comparison to methods involving actual measurement. Also, although the method disclosed in Japanese Patent No. 4554094 is accurate since exposure conditions are determined based on images that are actually captured, there has been a problem in that the release time lag until the actual shooting is long since shooting and image analysis need to be performed multiple times in order to determine the exposure conditions.

SUMMARY OF THE INVENTION

The present invention has been achieved in view of these problems in the conventional art, and provides an image capture apparatus capable of accurately determining exposure conditions for multiple images to be used in high dynamic range compositing based on a captured image in a short time period, as well as a method of controlling the same.

According to an aspect of the invention, there is provided an image capture apparatus capable of high dynamic range shooting in which a plurality of images for creating a high dynamic range image are captured, comprising: an image capture unit; a standard exposure computation unit that computes an HDR standard exposure that is a standard exposure used for high dynamic range shooting, by correcting a standard exposure, which is based on a subject luminance of an image obtained by the image capture unit, toward over-exposure or under-exposure; a dynamic range computation unit that computes a scene dynamic range based on luminance information obtained from an image captured with the HDR standard exposure, and based on luminance information obtained from an image captured with an exposure, wherein the standard exposure exists between the exposure and the HDR standard exposure; and a determination unit that determines an exposure range of a plurality of images for creating a high dynamic range image, based on the scene dynamic range computed by the dynamic range computation unit.

According to another aspect of the invention, there is provided an image capture apparatus that performs shooting of a plurality of images for creating a composite image, comprising: an image capture unit; an exposure computation unit that computes a first exposure obtained by correcting a reference exposure, the reference exposure being based on a subject luminance of an image obtained by the image capture unit; a luminance distribution information computation unit that computes scene luminance distribution information based on luminance information obtained from an image captured with the first exposure, and based on luminance information obtained from an image captured with an exposure that is different from the first exposure; and a determination unit that determines an exposure range of a plurality of images for creating a composite image, based on the scene luminance distribution information.

According to a further aspect of the invention, there is provided an electronic device comprising or connected to the image capture apparatus according to the present invention.

According to another aspect of the invention, there is provided a method of controlling an image capture apparatus that has an image sensor and is capable of high dynamic range shooting in which a plurality of images for creating a high dynamic range image are captured, the method comprising: a step of computing an HDR standard exposure that is a standard exposure used for high dynamic range shooting, by correcting a standard exposure, which is based on a subject luminance of an image obtained by the image sensor, toward over-exposure or under-exposure; a step of computing a scene dynamic range based on luminance information obtained from an image captured with the HDR standard exposure, and based on luminance information obtained from an image captured with an exposure, wherein the standard exposure exists between the exposure and the HDR standard exposure; and a step of determining an exposure range of a plurality of images for creating a high dynamic range image based on the scene dynamic range.

According to a further aspect of the invention, there is provided a method of controlling an image capture apparatus that has an image sensor and is capable of capturing a plurality of images for creating a composite image, comprising: a step of computing a first exposure obtained by correcting a reference exposure, the reference exposure being based on a subject luminance of an image obtained by the image sensor; a of computing scene luminance distribution information based on luminance information obtained from an image captured with the first exposure, and based on luminance information obtained from an image captures with an exposure that is different from the first exposure; and a step of determining an exposure range of a plurality of images for creating a composite image, based on the scene luminance distribution information.

According to another aspect of the invention, there is provided a non-transitory computer-readable storage medium that stores program for causing a computer included in an image capture apparatus to execute steps of the control method of an image capture apparatus according to the present invention.

Further features of the present invention will become apparent from the following description of exemplary embodiments with reference to the attached drawings.

BRIEF DESCRIPTION OF THE DRAWINGS

FIGS. 2A and 2B are diagrams showing examples of area division during metering.

FIG. 6 is a diagram showing examples of weighted coefficients of metering areas.

FIGS. 8A and 8B are diagrams showing the difference in release time lag between conventional technology and an embodiment of the present invention.

FIG. 9 is a diagram for describing a method of determining an exposure range for HDR shooting.

FIG. 10 is a flowchart for describing actual shooting processing performed in step S43 in FIG. 4.

FIG. 11 is a flowchart for describing development and HDR composite processing performed in S44 in FIG. 4.

DESCRIPTION OF THE EMBODIMENTS

Exemplary embodiments of the present invention will now be described in detail in accordance with the accompanying drawings.

First Embodiment

A digital camera will be described in the embodiment below as an example of an image capture apparatus according to the present invention. Note that the present invention is applicable not only to devices that are primarily intended for image capture, such as a digital camera, but also to arbitrary devices with an image capture apparatus that is built in or externally connected, such as cellular phones, personal computers (laptop type, desktop type, tablet type, and the like), and game machines. Accordingly, the term "image capture apparatus" in the present specification is intended to encompass arbitrary electronic devices that include an image capture function.

Figure 1:
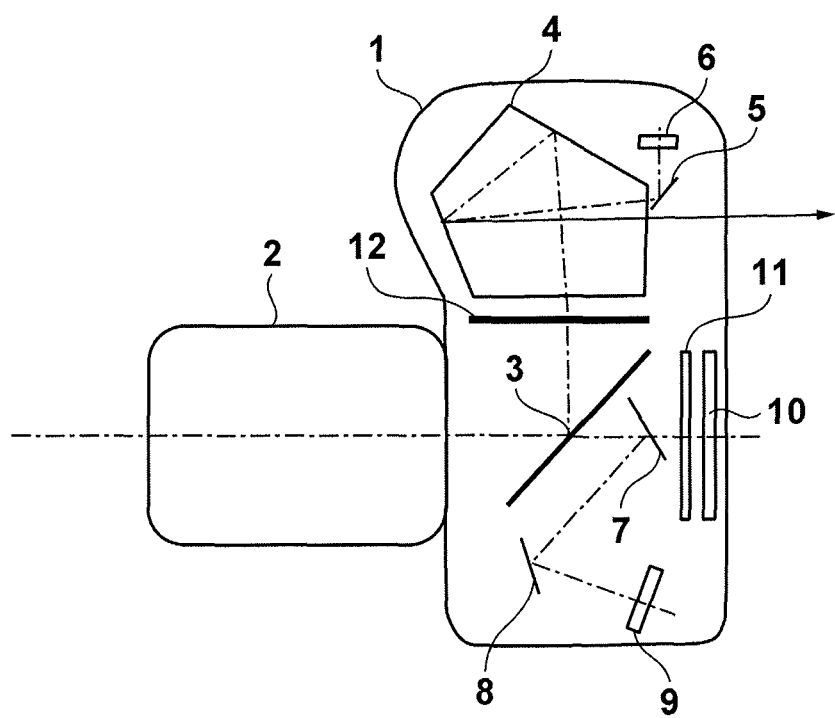
FIG. 1 is a cross-sectional view of a digital single-lens reflex camera as an example of an image capture apparatus according to embodiments of the present invention.

FIG. 1 is a cross-sectional view showing the arrangement of mainly optical members, sensors, and the like of a camera according to an embodiment of the present invention. The camera in the present embodiment is a so-called digital single-lens reflex camera with an interchangeable lens, and it has a camera body 1 and an interchangeable lens 2.

In the camera body 1, an image sensor 10 is, for example, a CMOS image sensor or a CCD image sensor, and multiple pixels (accumulation-type photoelectric conversion elements) are arranged thereon. A mechanical shutter 11 provided near the front of the image sensor 10 controls the exposure timing and exposure duration of the image sensor 10. A semi-transmissive main mirror 3, and a first reflection mirror 7 arranged behind the main mirror 3 moves to an upper portion at the time of shooting. Luminous flux reflected by the first reflection mirror 7 is further reflected by a second reflection mirror 8 so as to enter a focus detection sensor 9. The focus detection sensor 9 may be an image sensor in which the number of pixels is smaller than that of the image sensor 10, for example. The first reflection mirror 7, the second reflection mirror 8, and the focus detection sensor 9 are configurations for performing focus detection with a phase-difference detection system at an arbitrary position on an image capture screen.

A metering sensor (AE sensor) 6 receives an image of the image capture screen reflected by a pentaprism 4 and a third reflection mirror 5. Similarly to the focus detection sensor 9, the AE sensor 6 may also be an image sensor in which the number of pixels is less than that of the image sensor 10. As illustrated in FIG. 2A, the light reception unit of the AE sensor 6 is divided into multiple areas, and luminance information of the subject can be output for each region. Note that the example in FIG. 2A shows the case of division into 63 areas, 9 vertically×7 horizontally, but there is no limitation on the number of divided regions. Note that in addition to the pixels arranged in the light reception unit, an amplifier circuit for pixel signals and a peripheral circuit for signal processing and the like are formed in the image sensor.

A finder optical system is configured by the pentaprism 4. Although it is not shown in FIG. 1, the subject image reflected by the pentaprism 4 is viewable through an eyepiece. Among the light beams reflected by the main mirror 3 and diffused by a focus plate 12, a portion that is off of the light axis enters the AE sensor 6. The interchangeable lens 2 performs information communication with the camera body 1 as needed through a contact on a lens mount provided in the camera body 1.

Figure 3:
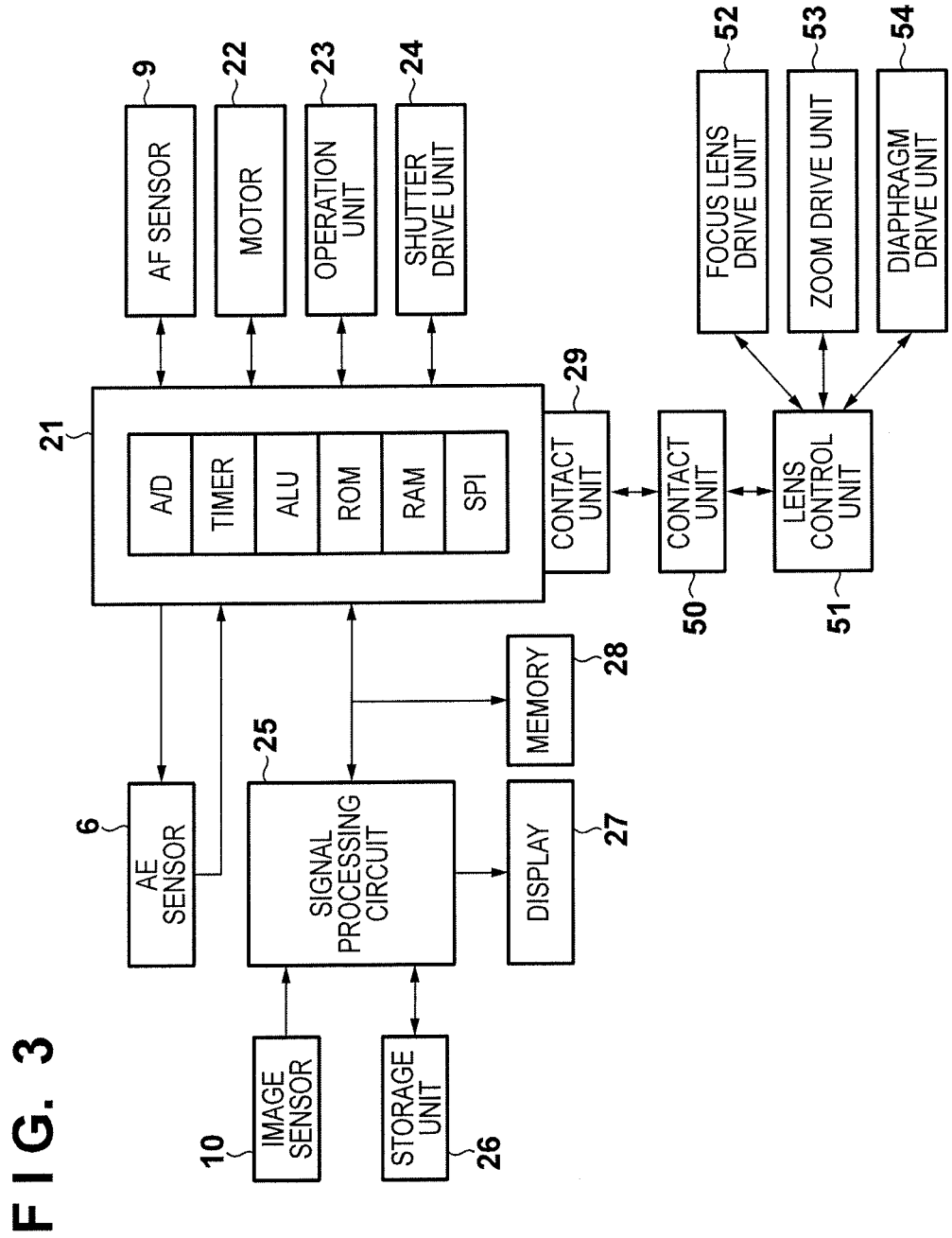
FIG. 3 is a block diagram showing an example of a configuration of electrical circuits of a camera body 1 and an interchangeable lens 2 therefor in FIG. 1.

FIG. 3 is a block diagram showing an example of a configuration of electrical circuits of the camera body 1 and the interchangeable lens 2 therefor in FIG. 1. In the camera body 1, a control unit 21 is a one-chip microcomputer for example, with an ALU (arithmetic and logic unit), a ROM, a RAM, an A/D converter, a timer, a serial communication port (SPI) and the like built in. The control unit 21 controls operation of the camera body 1 and the interchangeable lens 2 by executing a program stored in the ROM for example. Specific operations of the control unit 21 will be described later.

Output signals from the focus detection sensor 9 and the AE sensor 6 are connected to an A/D converter input terminal of the control unit 21. A signal processing circuit 25 controls the image sensor 10 in accordance with instructions from the control unit 21, applies A/D conversion and signal processing to the signals output by the image sensor 10, and obtains an image signal. Also, when the obtained image signal is to be recorded, the signal processing circuit 25 performs necessary image processing, such as compression and compositing. A memory 28 is a DRAM or the like, and is used as a work memory for when various types of signal processing are performed by the signal processing circuit 25, and is used as a VRAM for when an image is to be displayed on a display 27 (described below). The display 27 is configured by a liquid crystal display panel or the like, and displays information such as camera setting values, messages, menu screens, and the like, as well as captured images. The display 27 is controlled by instructions from the control unit 21. A storage unit 26 is a non-volatile memory such as a flash memory, and signals of captured images are input from the image processing circuit 25.

A motor 22 moves the main mirror 3 and the first reflection mirror 7 up and down and charges the mechanical shutter 11 under control of the control unit 21. An operation unit 23 is a group of input devices such as switches for a user to operate the camera. A release switch for inputting an instruction to start image capture preparation and an instruction to start image capture, a shooting mode selection switch for selecting a shooting mode, direction keys, a determination key, and the like are included in the operation unit 23. A contact unit 29 is a contact for performing communication with the interchangeable lens 2, and an input/output signal of the serial communication port in the control unit 21 is connected thereto. A shutter drive unit 24 is connected to the output terminal of the control unit 21 and drives the mechanical shutter 11.

A contact unit 50 that is paired with the contact unit 29 is provided in the interchangeable lens 2. A lens control unit 51, which is a one-chip microcomputer similar to the control unit 21, is connected to the contact unit 50 and can communicate with the control unit 21. The lens control unit 51 executes a program stored in the ROM for example, and controls the operation of the interchangeable lens 2 based on instructions from the control unit 21. Also, it notifies the control unit 21 of information such as the state of the interchangeable lens 2. A focus lens drive unit 52 is connected to the output terminal of the lens control unit 51 and drives the focus lens. A zoom drive unit 53 changes the angle of view of the interchangeable lens under control of the lens control unit 51. A diaphragm drive unit 54 adjusts the amount of opening of the diaphragm under control of the lens control unit 51.

When the interchangeable lens 2 is mounted to the camera body 1, the lens control unit 51 and the control unit 21 in the camera main body can perform data communication via the contact units 29 and 50. Also, power for driving a motor and an actuator inside of the interchangeable lens 2 is supplied through the contact units 29 and 50. Optical information specific to the lens and information relating to subject distance based on a distance encoder, and the like, which are needed for the control unit 21 in the camera body to perform focus detection and exposure computation, are output by data communication from the lens to the control unit 21 in the camera main body. Also, focus adjustment information obtained as a result of the control unit 21 in the camera body performing focus detection and exposure computation, as well as aperture information are output by data communication from the control unit 21 in the camera main body to the lens, and the lens controls the diaphragm in accordance with the focus adjustment information.

Note that exposure computation is performed using the image sensor 10 rather than the AE sensor 6 in the present embodiment. Accordingly, the AE sensor 6 in FIG. 1 and FIG. 3 is not essential. In the case where exposure computation is performed using the image sensor 10 (the output signal thereof), an image signal obtained by applying predetermined signal processing to the signal output from the image sensor 10 by the signal processing circuit 25 is input to the control unit 21 as metering results, and exposure computation is performed with the control unit 21.

Figure 4:
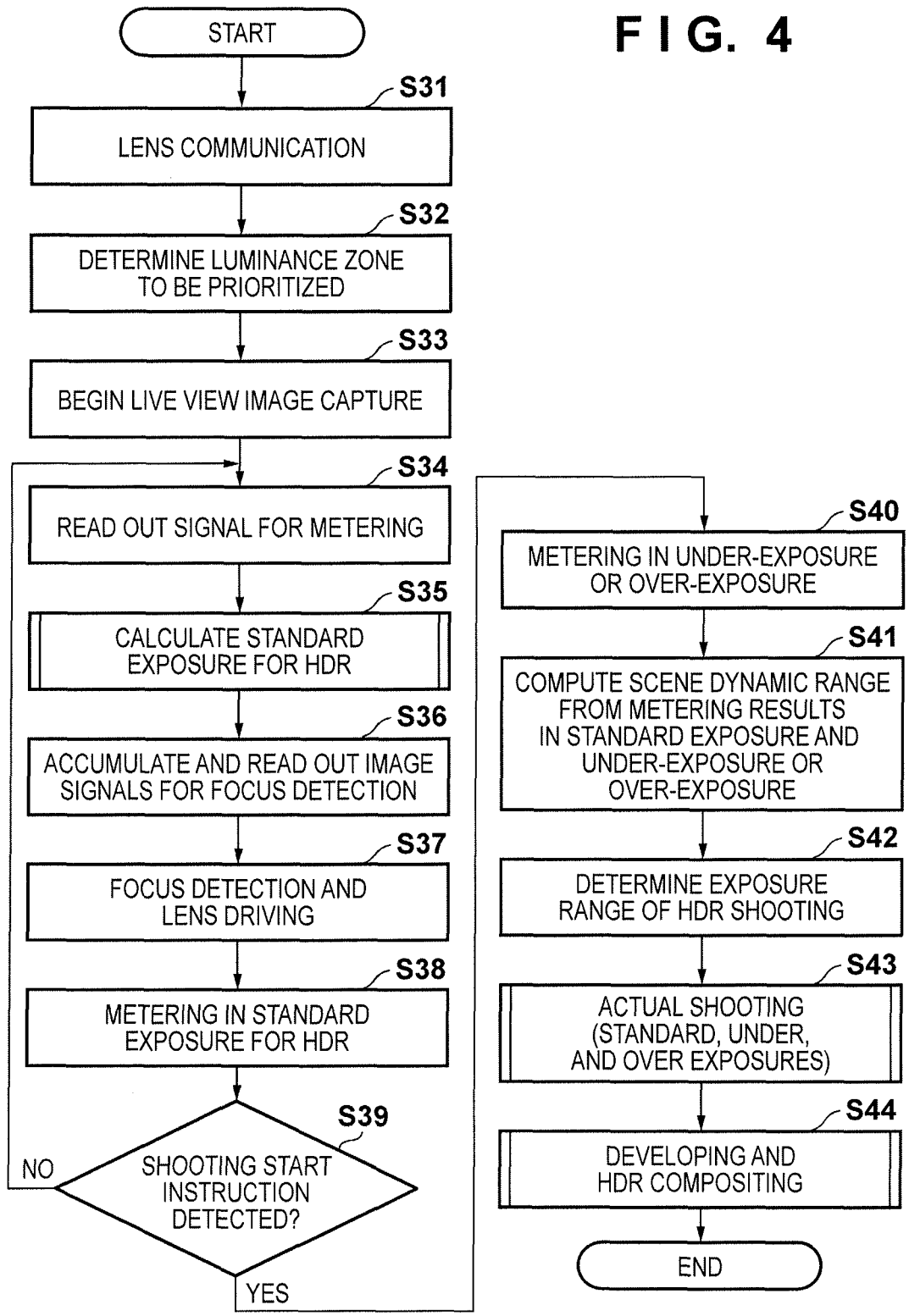
FIG. 4 is a flowchart for describing the operation of a camera according to a first embodiment of the present invention.

FIG. 4 is a flowchart for describing basic operations of the control unit 21 in the camera body 1 in the present embodiment. For example, when the control unit 21 becomes operable due to a power supply switch included in the operation unit 23 being switched on, or the like, the processing shown in FIG. 4 is executed.

First, the control unit 21 performs communication with the lens control unit 51 in the interchangeable lens 2, and obtains various types of lens information that is needed for focus detection and metering (step S31).

Next, the control unit 21 judges the luminance zone to be prioritized according to the shooting mode for example (step S32). Specifically, if the shooting mode is "backlit scene mode", a low-luminance zone is judged to be the luminance zone to be prioritized in order to suppress blocked-up shadows in the dark portions, and if the shooting mode is "spotlight mode", a high-luminance zone is judged to be the luminance zone to be prioritized in order to suppress blown-out highlights in the bright portions. Alternatively, this processing can be rephrased as a judgment between whether to suppress blocked-up shadows in the dark portions or to suppress blown-out highlights in the bright portions. Note that although the judgment of the luminance zone to be prioritized can be performed with ease by associating the set shooting mode and the luminance zone to be prioritized in advance, it is also possible to perform this judgment using other methods. For example, as will be described in a second embodiment, a scene that corresponds to a backlit scene or a spotlight scene may be detected by using a scene judgment technique on a captured image. Also, this type of detection can be performed for scenes in which blocked-up shadows or blown-out highlights are likely to appear, rather than being limited to backlit scenes and spotlight scenes.

In step S33, the control unit 21 begins to shoot a moving image, generally called a live view image (or a through-the-lens image), which is performed in order to cause the display 27 to function as an electronic viewfinder. This shooting can be implemented by raising the main mirror 3 and first reflection mirror 7, releasing the mechanical shutter 11, and continuously executing shooting using a so-called electronic shutter in a state in which the image sensor 10 is exposed. Note that since the mirrors are up in this state, the AE sensor 6 cannot perform metering.

After starting the shooting of a live view image in step S33, the control unit 21 periodically executes acquisition of signals for metering by the image sensor 10 in step S34. In actuality, it is sufficient that one frame of the live view image is acquired as an image signal for metering. The control unit 21 reads out acquired image signals from the image sensor 10, performs A/D conversion, and stores the resulting signals in the RAM.

Next, the control unit 21 computes the standard exposure for high dynamic range shooting, which is sometimes referred to as HDR standard exposure (step S35). A specific example of a computation operation of such HDR standard exposure will be described below in accordance with the flowchart in FIG. 5. The pixel area used by the image sensor 10 to acquire the signal for metering is divided into 9×7 blocks, as shown in FIG. 2A, and luminance information is acquired by the control unit 21 for each block based on the signals obtained by the pixels included in the block (step S411). Luminance information for a block can be obtained by averaging the luminance of all pixels in the block, for example. Note that the computation of luminance can be performed by conversion into an APEX (additive system of photographic exposure) By value.

Here, letting the luminance information of blocks 11 to 79 be expressed as ED11 to ED79, the control unit 21 computes projection data in the row direction (Y1 to Y7) and in the column direction (X1 to X9) based on ED11 to ED79. Generally, a method of conversion from data in a two-dimensional array having m rows×n columns into data in a one-dimensional array obtained by performing addition or an arithmetic average in the column and row direction is called a projection from two dimensions to one dimension. Additionally, the data of a one-dimensional array obtained as a result of adding (or averaging) in the row direction and column direction is referred to as a projection image or projection data. In the present embodiment, projection data Y1 to Y7 and X1 to X9 are computed from luminance information ED11 to ED79 as arithmetic averages as follows (step S412).

$X1=\Sigma(EDx1) \div 7$ note that x=1 to 7
$X2=\Sigma(EDx2) \div 7$ note that x=1 to 7
$X3=\Sigma(EDx3) \div 7$ note that x=1 to 7
$X4=\Sigma(EDx4) \div 7$ note that x=1 to 7
$X5=\Sigma(EDx5) \div 7$ note that x=1 to 7
$X6=\Sigma(EDx6) \div 7$ note that x=1 to 7
$X7=\Sigma(EDx7) \div 7$ note that x=1 to 7
$X8=\Sigma(EDx8) \div 7$ note that x=1 to 7
$X9=\Sigma(EDx9) \div 7$ note that x=1 to 7
$Y1=\Sigma(ED1y) \div 9$ note that y=1 to 9
$Y2=\Sigma(ED2y) \div 9$ note that y=1 to 9
$Y3=\Sigma(ED3y) \div 9$ note that y=1 to 9
$Y4=\Sigma(ED4y) \div 9$ note that y=1 to 9
$Y5=\Sigma(ED5y) \div 9$ note that y=1 to 9
$Y6=\Sigma(ED6y) \div 9$ note that y=1 to 9
$Y7=\Sigma(ED7y) \div 9$ note that y=1 to 9

Next, in step S32, the control unit 21 causes the processing to transition to step S413 if it is judged that a low-luminance zone is to be prioritized, or to step S423 if it is judged that a high-luminance zone is to be prioritized.

In step S413, the control unit 21 detects a maximum value Emax of the projection data Y1 to Y7 and X1 to X9.

Next, in step S414, the control unit 21 applies predetermined weighted computation to the luminance information ED11 to ED79 of the blocks and computes a subject luminance value Ea. In FIG. 6, examples of predetermined weighting values $w_{xy}$ that correspond to the blocks are shown. Here, x=1 to 7, and y=1 to 9.

$$Ea = \Sigma\{w_{xy} \times EDxy\} \div \Sigma w_{xy}$$

Note that the predetermined weighting values $w_{xy}$ of the areas shown in FIG. 6 are examples of weights for center-weighted average metering in which the middle portion of the screen has high values and the peripheral portion has low values, but other weights may be used.

In step S415, the control unit 21 detects a minimum value Emin of the projection data Y1 to Y7 and X1 to X9 computed in step S412. Then, in step S416, the control unit 21 computes an exposure correction value α for low-luminance zone prioritization according to the equation below for example, based on the projection data minimum value Emin and the subject luminance value Ea.

$$\alpha = (E\min - Ea) \times 0.5$$

This exposure correction value α is for performing exposure correction in accordance with an empirical rule that there is a high possibility that a subject is present in a low-luminance portion in the screen, in a scene in which a low-luminance zone is to be prioritized, such as a "backlit scene mode". The coefficient 0.5 is merely an example, and it is sufficient that the most appropriate value is determined according to how bright the low-luminance subject during backlighting is to appear.

In step S417, the control unit 21 computes a final subject luminance value Ee that is appropriate for low-luminance zone prioritization in accordance with the equation below.

$$Ee = Ea + \alpha$$

Here, α is a negative value.

For example, if it is assumed that Ea=7.625 [Bv] and Emin=5.25 [Bv]:

$$Ee = Ea + \alpha$$
$$= 7.625 + (5.25 - 7.625) * 0.5$$
$$= 6.4375$$

In other words, an image is shot at a brighter level than normal (standard exposure is corrected toward over-exposure) by the subject luminance being lowered from 7.625 to 6.4375 (Ea→Ee) and the By value corresponding to the standard exposure decreasing.

In step S418, the control unit 21 determines the shutter speed, aperture value, and shooting sensitivity corresponding to HDR standard exposure based on the computed subject luminance value Ee.

On the other hand, if it is judged in step S32 that a high-luminance zone is to be prioritized, the control unit 21 detects the projection data minimum value Emin in step S423. Then, in step S424, the control unit 21 computes the subject luminance value Ea similarly to step S414. The control unit 21 detects the projection data maximum value Emax in step S425, and computes the exposure correction value α in accordance with the equation below in step S426.

$$\alpha = (Emax - Ea) \times 0.5$$

This exposure correction value α is for performing exposure correction in accordance with an empirical rule that there is a high possibility that the main subject is present in a high-luminance portion in the screen, in a scene in which a high-luminance zone is to be prioritized, such as a "spotlight mode". The coefficient 0.5 is merely an example, and it is sufficient that the most appropriate value is determined according to how dark the low-luminance subject is to appear.

In step S427, the control unit 21 computes the final subject luminance value Ee with the equation below.

$$Ee = Ea + \alpha$$

Here, α is a positive value.

For example, if it is assumed that Ea=7.625 [Bv] and Emax=9 [Bv]:

$$\begin{aligned} Ee &= Ea + \alpha \\ &= 7.625 + (9 - 7.625) * 0.5 \\ &= 8.3125 \end{aligned}$$

Thus, an image is captured at a darker level than normal (standard exposure is corrected toward under-exposure) due to the subject luminance being raised from 7.625 to 8.3125 (Ea→Ee) and the Bv value corresponds to the standard exposure increasing.

Returning to FIG. 4, the control unit 21 accumulates signals for focus detection with the image sensor 10 in step S36. Note that focus detection is not performed using the focus detection sensor 9 since continuous shooting is being performed with the mirrors up in order to perform live view display. Accordingly, focus detection using a contrast detection system is performed based on image signals obtained by the image sensor 10. When accumulation ends, the accumulated signals are read out, subjected to A/D conversion, and then stored in the RAM as image signals for focus detection.

In step S37, the control unit 21 computes the focus state of areas in the image capture screen based on lens information obtained in step S31 and image signals for focus detection, and determines a focus detection region to be in-focus. Note that the determination of the position of the focus detection region may be performed with another method, for example, a focus detection region designated by the user in advance by means of the operation unit 23 may be determined, or a focus detection region may be set to the face of a person using image recognition technology such as face detection. The control unit 21 computes a lens movement amount for focusing on the focus detection region in accordance with the focus state in the determined focus detection region and the lens information, controls the focus lens drive unit 52 by means of the lens control unit 51, and moves the focus lens to a focal position.

Thus, the interchangeable lens 2 is in a focused state with respect to the subject in the focus detection area. When the focus lens is driven, information from the distance encoder changes, and therefore the control unit 21 updates various types of lens information in the interchangeable lens 2.

In step S38, in order to compute the exposure conditions to be used for multiple shots during HDR shooting (to be described later), the control unit 21 performs metering in a state of the HDR standard exposure, in which low luminance is prioritized more than in normal standard exposure. This metering is performed with a method similar to that in step S34.

According to the above-described control, the camera is in a state in which preparations for being able to capture an image of a subject in standard exposure are complete. When the shutter button is pressed and an instruction to begin shooting is given, the control unit 21 begins the actual shooting (step S39). With HDR shooting, standard exposure shooting is performed, and then under-exposure shooting and over-exposure shooting are performed. When exposure correction is performed according to the user's intent, it is not necessarily the case that the intermediate exposure will be a standard exposure, but here, for the sake of convenience, the intermediate exposure is assumed to be the standard exposure. Also, the shooting order does not need to be in the order of standard exposure, then under-exposure, and then over-exposure, and the order can be set arbitrarily.

In order to precisely determine the exposures for under-exposure shooting and for over-exposure shooting, the dynamic range of the scene needs to be measured by performing metering with under-exposure and over-exposure relative to the standard exposure. However, when under-exposure metering and over-exposure metering are performed, there is a long release time lag from when the shooting start instruction is input until when actual shooting is started.

In view of this, in the present embodiment, the release time lag is shortened due to performing only either under-exposure or over-exposure metering processing after a shooting instruction is given, according to the luminance zone to be prioritized (step S40). Below, the principle of the present embodiment will be explained.

Figure 5:
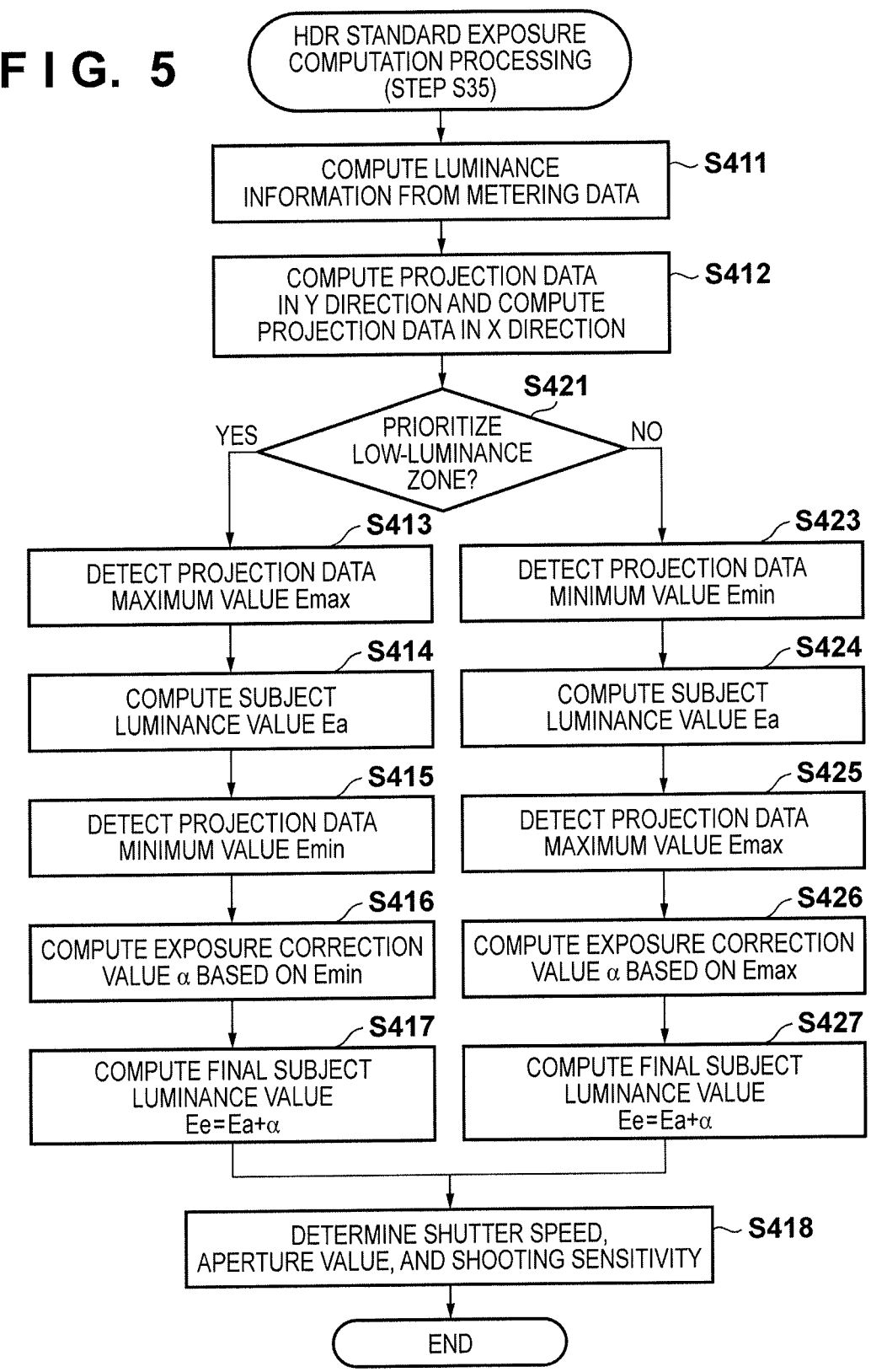
FIG. 5 is a flowchart for describing standard exposure computation processing performed in step S35 in FIG. 4.
Figure 7A:
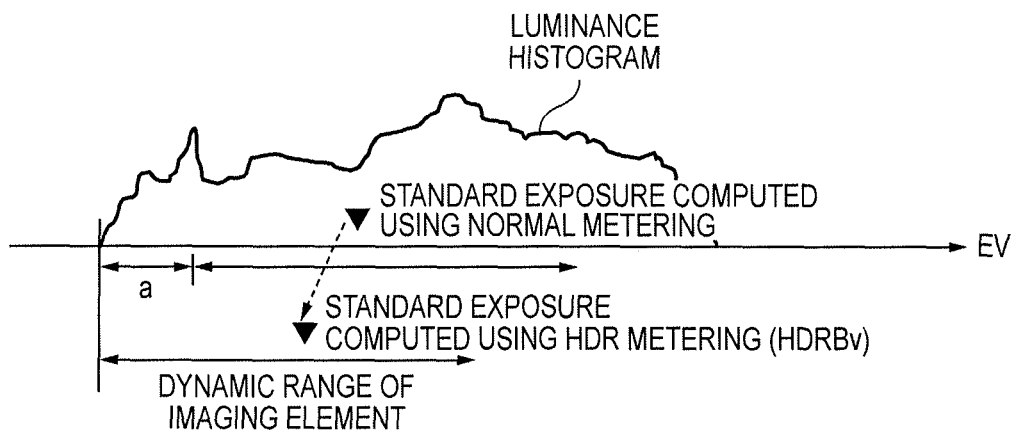
FIG. 7A is a diagram showing an example of standard exposure for normal shooting and standard exposure for HDR shooting according to an embodiment of the present invention.

In FIG. 7A, an example of a luminance histogram for a scene with a wide dynamic range (wide luminance distribution range) is shown. EV is the unit of luminance. If an image is captured with a standard exposure computed by normal metering, a low-luminance zone a outside of the dynamic range of the image sensor will contain blocked-up shadows and tonal gradation will be lost. However, if metering is performed with standard exposure based on the exposure computation processing for low-luminance zone prioritization, which is shown in FIG. 5, tonal gradation in the low-luminance zone is not lost.

Figure 7B:
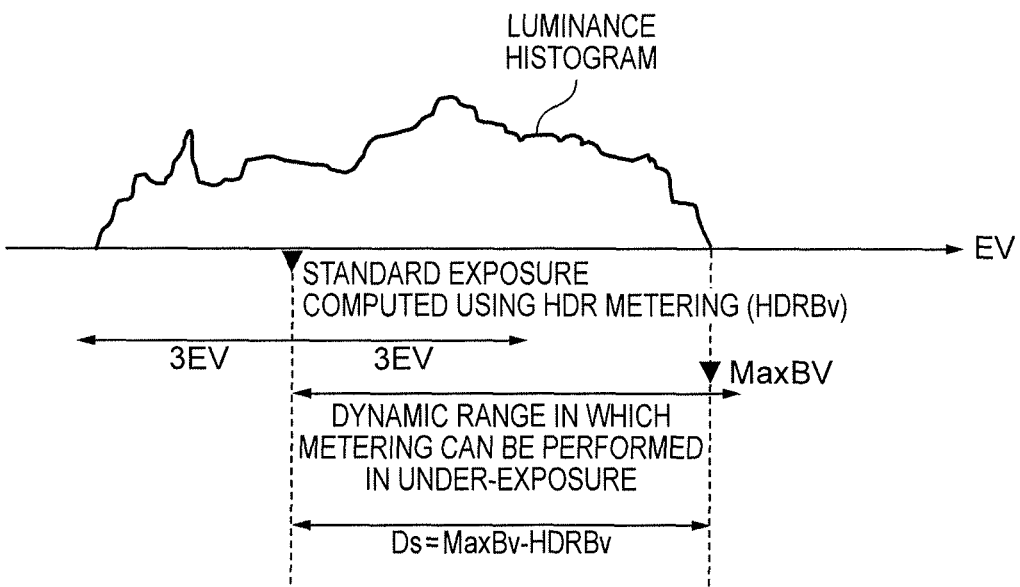
FIG. 7B is a diagram schematically showing a principle of scene dynamic range computation according to an embodiment of the present invention.

The control unit 21 computes the dynamic range as scene luminance distribution information based on metering results (HDRBv) in HDR standard exposure, and metering results in under-exposure (step S41). For example, with the scene shown in FIG. 7A, as shown in FIG. 7B, a scene dynamic range Ds is computed with the equation below based on metering results HDRBv in HDR standard exposure and a maximum luminance value MaxBv acquired by metering in under-exposure.

$$Ds = MaxBv - HDRBv$$

Thus, in the present embodiment, metering in standard exposure is not accompanied by metering in under-exposure and over-exposure, for example, after the shutter button is pressed as shown in FIG. 8A. In the present embodiment, as shown in FIG. 8B, metering is performed a total of two times, namely metering in under-exposure or over-exposure in addition to metering in HDR standard exposure. Because of this, the release time lag from when the shutter button is pressed until when the shooting is actually started can be shortened. Thus, the number of times metering is performed is reduced and the release time lag is shortened by accepting the fact that there is the possibility of a reduction in tonal gradation in whichever of the high-luminance zone and the low-luminance zone is not prioritized with respect to tonal gradation.

In step S42, the control unit 21 determines the most scene-appropriate exposure range for HDR shooting based on the scene dynamic range Ds. Here, if the standard exposure is assumed to be ±0 EV, shooting is performed with an exposure range that has the same range in both the + direction and − direction. Then, a selection is automatically made from ±1 EV, ±2 EV, and ±3 EV as options for the exposure range. Also, the dynamic range of the image sensor is assumed to be 6 EV (i.e., the dynamic range on the high-luminance side and the low luminance side is 3 EV each relative to the standard exposure).

In this case, relative to the HDR standard exposure based on HDRBv, the dynamic range Dh up to the maximum luminance value at which under-exposure shooting can be performed (with no blown-out highlights) is, as shown in FIG. 9:

Dh=4 EV (when the under-exposure is −1 EV relative to standard exposure)

Dh=5 EV (when the under-exposure is −2 EV relative to standard exposure)

Dh=6 EV (when the under-exposure is −3 EV relative to standard exposure)

Then, the control unit 21 determines the most appropriate exposure range for HDR shooting for the scene to be the exposure range that corresponds to the lowest Dh at which Dh is greater than or equal to Ds, that is to say, Dh≥Ds. In other words, the following determination is performed:

3 EV<$Ds$≤4 EV→±1 EV

4 EV<$Ds$≤5 EV→±2 EV

5 EV<$Ds$≤6 EV→±3 EV

6 EV<$Ds$→±3 EV

In a case such as that of scene 1 in FIG. 9, it is desirable that shooting is performed with ±3 EV since Ds is greater than 6 EV. In a case such as that of scene 2, it is desirable that shooting is performed with +3 EV since 5 EV<Ds 6 EV. In a case such as that of scene 3, it is desirable that shooting is performed with ±1 EV since 3 EV<Ds≤4 EV.

Note that in the case where Ds≤3 EV, the scene dynamic range is narrow, and therefore there is no need to perform HDR shooting.

On the other hand, even if a high-luminance zone is to be prioritized, it is sufficient that the exposure range is basically determined similarly to the case where a low-luminance zone is to be prioritized. If a high-luminance zone is to be prioritized, the high-luminance zone of the scene is addressed with metering using HDR standard exposure, and therefore metering in over-exposure is performed in order to perform metering for the low-luminance zone in step S40. Then, in step S41, the control unit 21 computes the scene dynamic range Ds in accordance with the following equation, based on the metering results HDRBv in HDR standard exposure and the minimum luminance value MinBv acquired with metering in over-exposure.

$Ds = MinBv - HDRBv$

The method of determining the exposure range based on the scene dynamic range Ds can be the same as that in the case where the low-luminance zone is prioritized.

By performing the processing from step S40 to step S42 in response to a shooting start instruction (shutter button press), the shooting exposure of multiple shots performed in HDR shooting is determined. The time needed for the processing from step S40 to step S42 is the release time lag.

In step S43, the control unit 21 performs the actual shooting (shooting in standard exposure, under-exposure, and over-exposure) based on the shooting exposure determined in step S35 and the exposure range determined in step S42.

The details of the actual shooting processing in step S43 will be explained with use of the flowchart in FIG. 10. First, the control unit 21 performs shooting with a shutter speed, aperture value, and capture sensitivity that correspond to standard exposure and were determined in step S35 (step S511). Then, the signals accumulated in the image sensor 10 are read out, subjected to A/D conversion, and then stored in the RAM as standard exposure image signals by the control unit 21 (step S512). Also, the control unit 21 sets the shutter speed to a high speed in accordance with the exposure range in order to realize the exposure range determined in step S42 in the next shooting in under-exposure.

In step S513, the control unit 21 performs shooting in under-exposure. Here, the aperture value and shooting sensitivity are the values determined in step S35, and the control unit 21 sets the shutter speed to a high speed in accordance with the exposure range determined in step S42, and performs shooting.

Then, the signals accumulated in the image sensor 10 are read out, subjected to A/D conversion, and then stored in the RAM as under-exposure image signals by the control unit 21 (step S514). Also, the control unit 21 sets the setting of the shutter speed determined in step S35 to a low speed in accordance with the exposure range in order to realize the exposure range determined in step S42 in the next shooting in over-exposure.

In step S515, the control unit 21 performs shooting in over-exposure. Here, the aperture value and shooting sensitivity are the values determined in step S35, and the control unit 21 sets the shutter speed to a low speed in accordance with the exposure range determined in step S42, and performs shooting.

Then, the signals accumulated in the image sensor 10 are read out, subjected to A/D conversion, and then stored in the RAM as over-exposure image signals by the control unit 21 (step S516). Note that the control unit 21 may return the shutter speed setting to the value set in step S35.

Note that, in the present embodiment, an example was given of the case where the shutter speed was changed from that in the standard exposure conditions in order to realize the exposure range, but it may also be realized by changing the image capture sensitivity. Note that since processing is performed in which the exposures of the images are equalized with digital gain in composite processing after shooting, the noise of an image captured at a high speed in under-exposure is amplified due to the application of gain, and therefore, image noise may be reduced before gain application by reducing the shooting sensitivity in shooting in under-exposure. Note that although it is also possible to change the aperture, the aperture is changed only in the case where a change can be performed to the extent that the subject field depth does not change.

Returning to FIG. 4, in step S44, the control unit 21 develops three images in which the exposures used in the actual shooting are standard exposure, under-exposure, and over-exposure, and performs high dynamic range compositing using the signal processing circuit 25 (step S44). As a method for HDR compositing, a method is conceivable in which the standard exposure, under-exposure, and over-exposure images are developed by undergoing gamma conversion with different gammas such that their respective exposures after being developed match, and then compositing is performed using the high-luminance portion of the under-exposure image, the midtone portion of the standard exposure image, and the low-luminance portion of the over-exposure image. Alternatively, a method is also conceivable in which an image with a wide dynamic range is created by compositing in the Bayer step, tone-mapping is performed, and the image is developed by being compressed to a desired output dynamic range, but either method may be used. The details of the processing in step S44 will be briefly described using the flowchart shown in FIG. 11.

The subject image formed by the interchangeable lens 2 is converted into electrical signals with the image sensor 10. In the present embodiment, the image sensor 10 is a single-panel color image sensor that includes a common primary-color color filter. The primary-color color filter is composed of three types of color filters having dominant transmission wavelength bands in the vicinity of 650 nm, 550 nm, and 450 nm respectively, and color plane images that correspond to the bands R (red), G (green), and B (blue) are acquired from luminous flux that is transmitted by the color filters. Three color filters are arranged in a specified arrangement in the single-panel color image sensor, and each pixel can acquire only the luminance of a single color plane. Because of this, a color mosaic image is output from the image sensor.

In step S521, the signal processing circuit 25 performs white balance processing. Specifically, it computes a white balance gain such that R, G, and B in the white areas of the image have the same value, and applies it to the image. In step S522, the image processing circuit 25 creates a color image in which all pixels have color information for R, G, and B by interpolating the color mosaic image. Furthermore, the signal processing circuit 25 applies matrix transformation (step S523) and gamma conversion (step S524) processing to the created color image. Subsequently, the signal processing circuit 25 applies processing for improving the appearance of the image (color adjustment processing) to the color image. An example of color adjustment processing is image correction such as saturation enhancement, hue correction, and edge enhancement.

When one high dynamic range image (HDR image) is to be created by compositing the images captured with different exposures, in order to acquire a high-quality HDR image using signals close to the standard exposure for the images, it is necessary to apply gain to the images so as to equalize the luminance level between the images. The gain needs to be set such that blown-out highlights and block-up shadows do not appear.

Note that the apparatus is designed such that the input and output characteristics of the gamma curve used in gamma conversion performed in step S524 (input/output characteristics) are the same when the gain computed from the exposure amount ratio is applied. In the case where the exposure range is ±3 EV when the gain applied to a standard exposure image is a factor of one, a factor of 8 gain is applied to the under-exposure image, and a factor of ⅛ gain is applied to the over-exposure image. The apparatus is designed such that the gamma curve after gain application is equalized as much as possible. By doing this, subsequently, when the image to be used for compositing is switched according to the luminance zone, the border can be made smooth.

The control unit 21 aligns the positions of the images in order to composite the images to which the above image forming processing was applied (step S526). Although there is no limitation on the alignment method, the method described below can be used for example. A movement amount and a movement direction are obtained such that the sum of the absolute value of the difference (SAD: sum of absolute difference) between the pixel values (luminance) of the image to serve as the positional reference (for example, the image captured first) and the pixel values (luminance) of another image is minimized. Then, an affine transformation corresponding to this movement amount and movement direction is applied to the other image. In the case where the image serving as the positional reference is the under-exposure image, the control unit 21 performs luminance-specific composite processing using a positionally-aligned standard exposure image and over-exposure image, and creates an HDR image (step S527). In the present embodiment, there are no particular limitations on the method of creating one HDR image by compositing images taken with different exposures, and since any commonly-known method can be employed, a description of details thereof will be omitted. The control unit 21 compresses the created HDR image with the image processing circuit 25 as needed, using a JPEG system or the like (step S528), and records the resulting image in the storage unit 26 (step S529).

As described above, in the present embodiment, when performing high dynamic range (HDR) shooting, it is determined whether the tonal gradation of a high-luminance zone or that of a low-luminance zone is to be prioritized. Then, standard exposure for HDR shooting is computed, which is corrected more toward the under-exposure side than in normal standard exposure if the high-luminance zone is to be prioritized, or corrected more toward the over-exposure side than in normal standard exposure if the low-luminance zone is to be prioritized. Furthermore, metering for determining the exposure range in actual shooting (metering for scene dynamic range measurement) is performed in over-exposure if a high-luminance zone is to be prioritized, or in under-exposure if a low-luminance zone is to be prioritized, in addition to in standard exposure for HDR shooting. Because of this, the number of times that metering is performed can be reduced by one compared to conventional technology, and the release time lag can be shortened. Furthermore, since the exposure range is determined using actual metering results, an exposure range for ensuring tonal gradation in the luminance zone to be prioritized can be determined accurately.

Second Embodiment

Next, a second embodiment of the present invention will be described. In the first embodiment, a luminance zone to be prioritized was determined according to the set shooting mode. Also, the luminance zone to be prioritized was a choice between a low-luminance zone and a high-luminance zone. In contrast to this, the second embodiment that will be described below differs from the first embodiment in that a backlit state and spotlight state are judged by performing scene analysis, and in that there are four luminance zones that can be prioritized, namely low luminance, mid-low luminance, mid-high luminance, and high luminance.

Figure 12A:
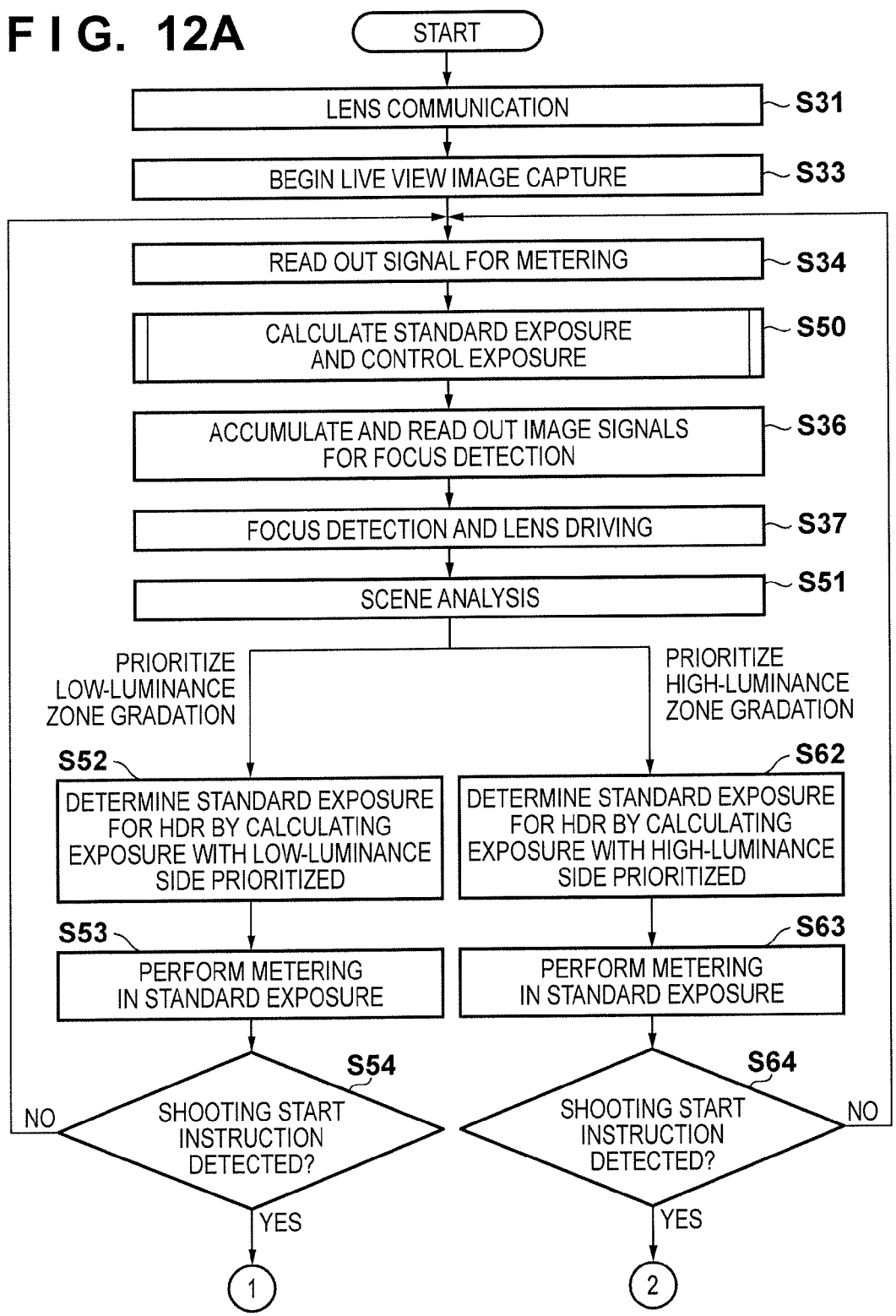
FIGS. 12A and 12B are flowcharts for describing the operation of a camera according to a second embodiment of the present invention.
Figure 12B:
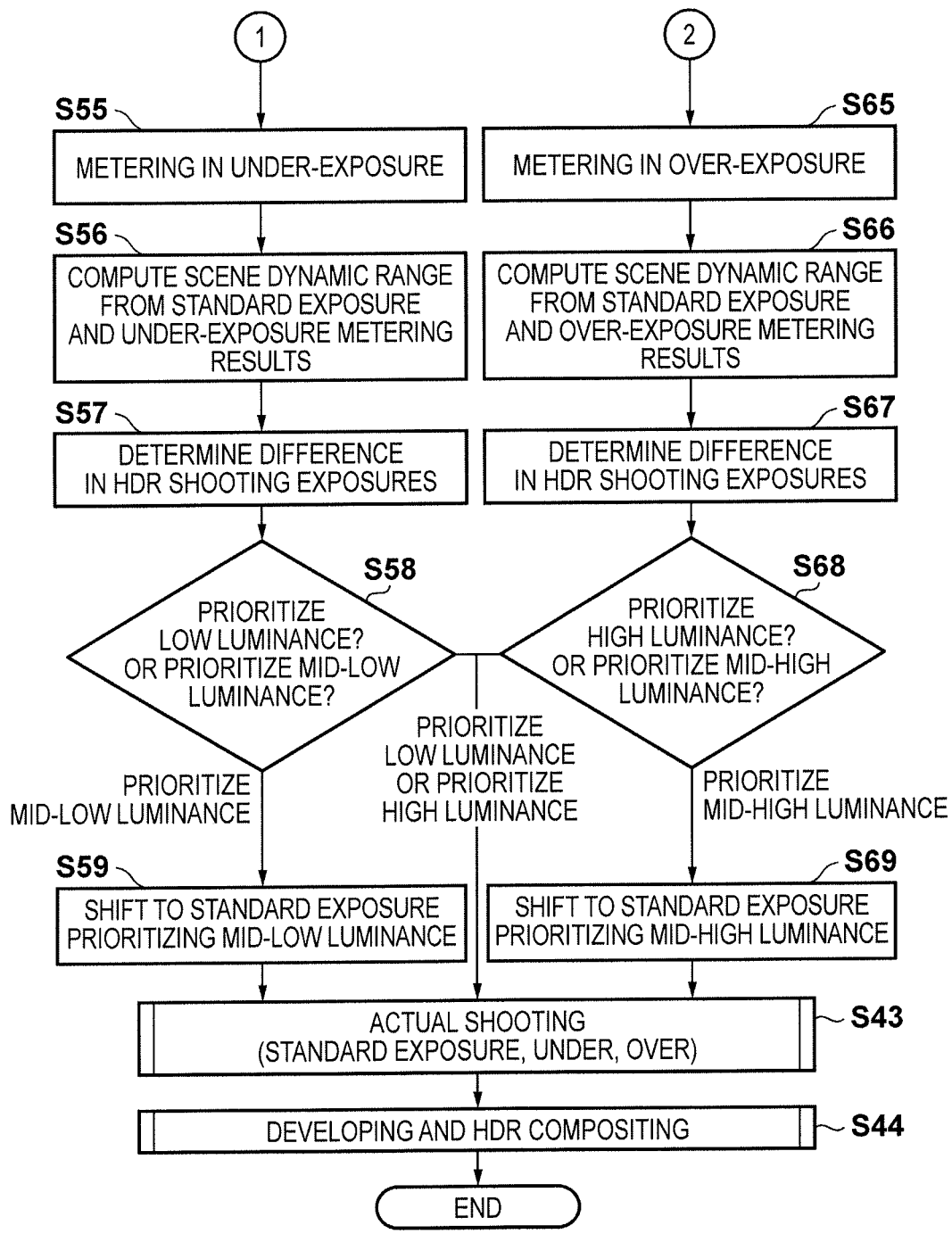

FIGS. 12A and 12B are flowcharts for describing operations of an interchangeable-lens digital camera serving as an example of an image processing apparatus according to the present embodiment. Note that the camera of the present embodiment is assumed to have the same configuration as the camera described in the first embodiment. Also, in FIGS. 12A and 12B, processes that are the same as those described in the first embodiment are indicated by the same reference numerals as in the first embodiment, and redundant descriptions thereof are omitted.

The processes in steps S31, S33, and S34 are as described in the first embodiment. In step S50, the control unit 21 performs a computation for normal standard exposure in which a luminance zone to be prioritized is not provided. In order to perform standard exposure computation, a subject luminance value Ee is obtained with the equation below (previously described in the first embodiment).

$$Ee = \Sigma\{w_{xy} \times EDsy\} + \Sigma w_{xy}$$

Then, the control unit 21 determines the shutter speed, aperture value, and shooting sensitivity that correspond to HDR standard exposure based on the subject luminance value Ee, and controls the exposure. The processing of steps S36 and S37 are as described in the first embodiment.

Figure 13:
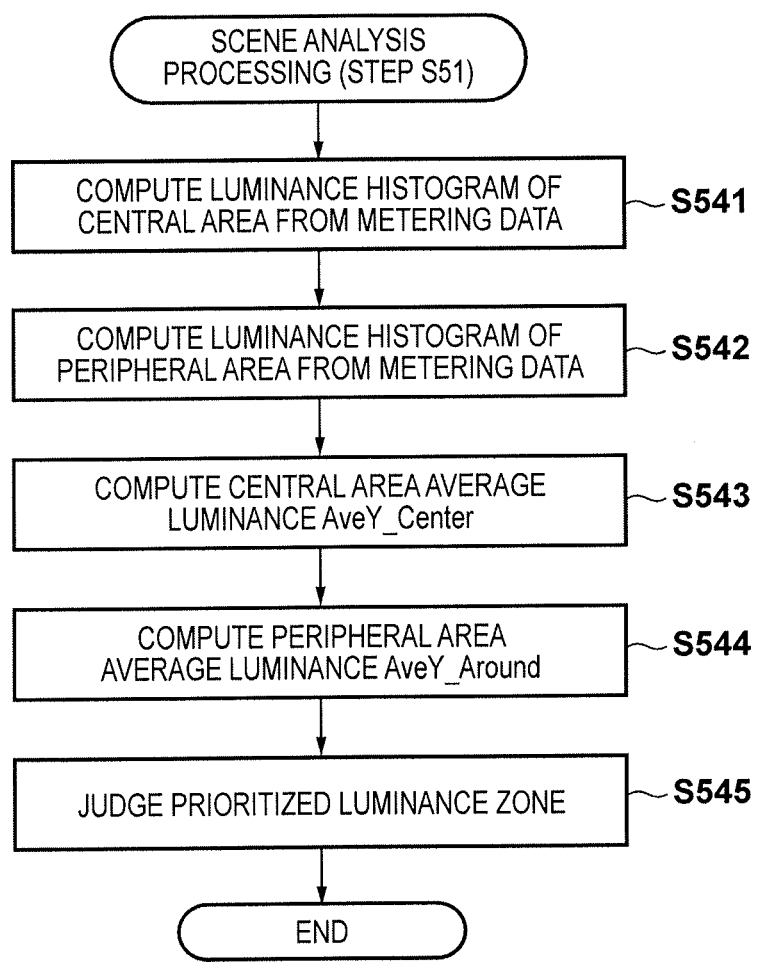
FIG. 13 is a flowchart for describing scene analysis processing performed in step S51 in FIG. 12A.

Next, in step S51, the control unit 21 applies scene analysis to the imaging signals for metering that were read out in step S34. This scene analysis processing will be described using the flowchart in FIG. 13. Here, a scene such as a backlit scene or a spotlight scene, in which there is a large difference in luminance between the central portion and peripheral portion of the screen, is identified using scene analysis.

In order to identify such a scene, the control unit 21 divides the imaging signals for metering that were read out in step S34 into two areas, namely a central area (in the figure, the area configured by grey blocks) and a peripheral area (the area configured by white blocks in the figure) in the angle of view (shooting field of view) as in FIG. 2B. Then the control unit 21 computes luminance histograms for the central area and the peripheral area (steps S541, S542).

Figure 14:
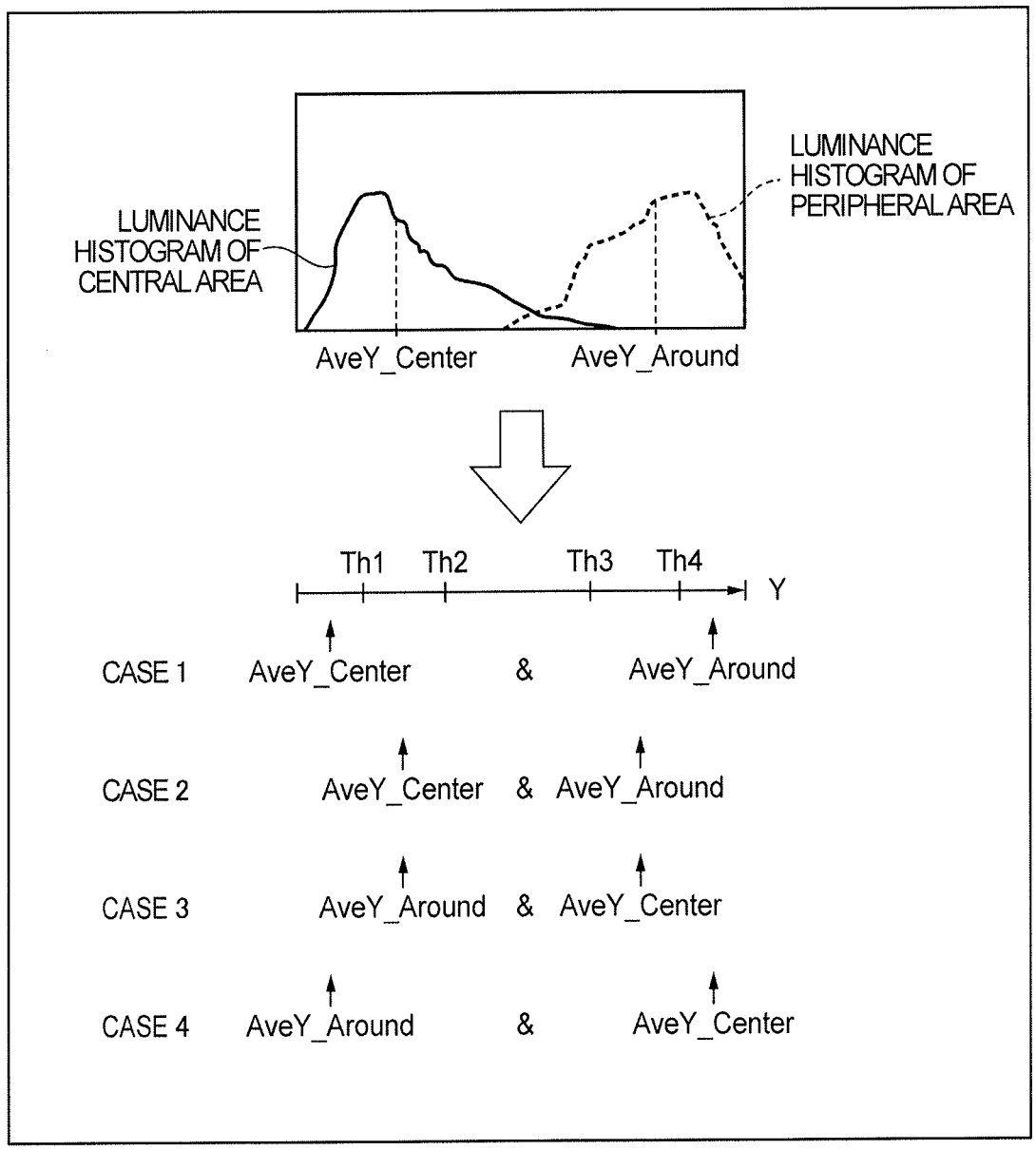
FIG. 14 is a diagram for describing an example of a method of judging a luminance zone to be prioritized based on a luminance histogram in a second embodiment of the present invention.

Examples of luminance histograms for a central area and for a peripheral area are shown in FIG. 14. The solid line is a luminance histogram of the central area, and the dashed line is a luminance histogram of the peripheral area. The control unit 21 furthermore computes an average luminance AveY_Center of the central area, and an average luminance AveY_Around of the peripheral area based on the computed luminance histograms (steps S543, S544). Then, the control unit 21 determines the luminance zone to be prioritized using threshold values (Th1 to Th4) of the above-described low luminance, mid-low luminance, mid-high luminance, and high luminance areas, and the magnitude relationship between the central area average luminance AveY_Center and the peripheral area average luminance AveY_Around.

Note that the threshold values Th1 to Th4 for defining the luminance zone to be prioritized in a luminance range can be statistically determined in advance. In FIG. 14, an example of the threshold values Th1 to Th4, the central area average luminance AveY_Center, and the peripheral area average luminance AveY_Around, as well as examples of the magnitude relationships thereof are shown.

In the present embodiment, the control unit 21 determines the luminance zone to be prioritized as described below.

AveYCenter<Th1, and Th4<AveYAround→prioritize low-luminance zone

Th1<AveY_Center<Th2, and Th3<AveY_Around<Th4→prioritize mid-low luminance zone

Th1<AveY_Around<Th2, and Th3<AveY_Center<Th4→prioritize mid-high luminance zone

AveYAround<Th1, and Th4<AveY_Center→prioritize high-luminance zone

Thus, scene analysis for identifying a scene with a large difference in luminance between the central portion and the peripheral portion of a screen, such as a backlit scene or a spotlight scene, is analysis of the scene contrast state. A scene with a wide dynamic range, typified by a backlit scene or a spotlight scene, is a high-contrast scene with a large difference between light and dark. Among the four cases shown in FIG. 14, case 1 and case 4 will correspond to scenes in which the contrast is quite high, and a typical backlit scene and spotlight scene will correspond to case 1 and case 4. Case 2 and case 3 are scenes with comparatively high contrasts, although not as high as those of case 1 or case 4.

As a result of the scene analysis processing in step S51, the control unit 21 transitions the processing to step S52 if it is determined that a low-luminance zone or a mid-low luminance zone is to be prioritized, or to step S62 if it is determined that a high-luminance zone or a mid-high luminance zone is to be prioritized.

In step S52, the control unit 21 determines HDR standard exposure in the case of low-luminance zone prioritization, similarly to steps S411 to S418 in FIG. 4. Also, in step S62, the control unit 21 determines HDR standard exposure in the case of high-luminance zone prioritization similarly to the first embodiment using the procedures of steps S411, S412, S423 to S427, and S418 in FIG. 4.

Excluding the fact that under-exposure and over-exposure are fixed, the subsequent processing of steps S53 to S57 and steps S63 to S67 are similar to steps S38 to S42 in FIG. 4.

Then, in steps S58 and S68, the control unit 21 branches the processing according to the luminance zone to be prioritized. Specifically, if a low-luminance zone or a high-luminance zone is to be prioritized, the control unit 21 immediately causes the processing to transition to step S43, which is processing that is similar to the first embodiment, and subsequently performs processing similarly to the first embodiment. Also, the processing transitions to step S59 if a mid-low luminance zone is to be prioritized, and to step S69 if a mid-high luminance zone is to be prioritized.

Figure 15:
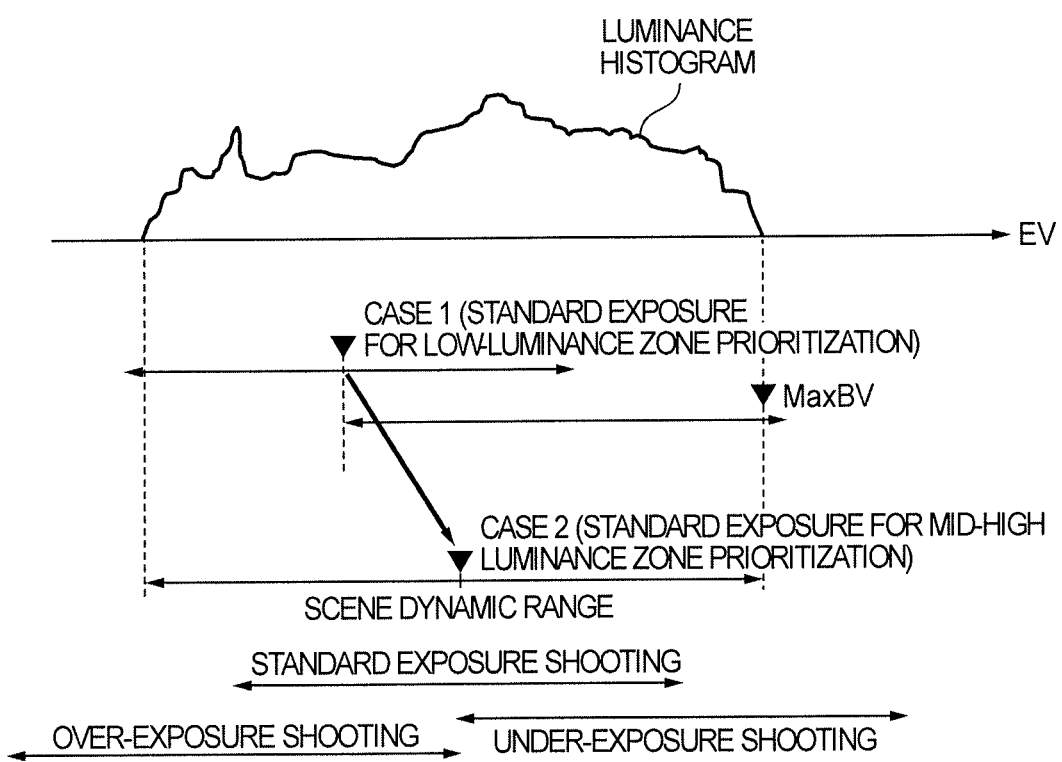
FIG. 15 is a diagram schematically showing processing for correcting standard exposure for HDR shooting according to the luminance zone to be prioritized in the second embodiment of the present invention.

In step S59, the control unit 21 corrects HDR standard exposure in the case of low-luminance zone prioritization toward those for a mid-low luminance zone. This correction need only be performed such that a HDR standard exposure based on HDRBv in the case of low-luminance zone prioritization is shifted a predetermined amount toward high luminance, as shown in FIG. 15 for example. The shift amount can be set in advance according to the range of the low-luminance zone and the mid-low luminance zone.

Thus, by correcting and using a HDR standard exposure based on HDRBv in the case of low-luminance zone prioritization depending on the low-luminance zone and the mid-low luminance zone, HDR shooting in which the tonal gradation of a mid-low luminance zone is prioritized and HDR image creation can be realized. Also, since there is little increase in the amount of digital gain, which causes S/N deterioration in gamma processing in the developing step, compared to that in standard exposure for low-luminance zone prioritization, there is a benefit in that there is little image quality degradation.

In step S69, the control unit 21 corrects standard exposure conditions for HDR shooting in the case of high-luminance zone prioritization toward those for a mid-high luminance zone. The correction method need only be similar to that in step S59, and the HDR standard exposure based on HDRBv in the case of high-luminance zone prioritization need only be shifted a predetermined amount toward the low luminance side.

In steps S59 and S69, when the standard exposure for HDR shooting in the case of mid-low luminance zone prioritization and in the case of mid-high luminance zone prioritization is determined, the control unit 21 transitions the processing to step S43, and subsequently performs processing similarly to the first embodiment.

As described above, in the present embodiment, in addition to the effects of the first embodiment, it is possible to automatically and optimally set exposure conditions for high dynamic range shooting according to the scene by determining the luminance zone to be prioritized using scene analysis. Also, exposure conditions for high dynamic range shooting can be set to a more appropriate value in a scene due to having a higher number of luminance zones that can be prioritized than in the first embodiment. Note that although four luminance zones are used in the present embodiment, there is no limitation on the number of luminance zones, and five or more, or three may be used.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-161966, filed on Jul. 20, 2012, which is hereby incorporated by reference herein in its entirety.

What is claimed is:

1. An image capture apparatus capable of high dynamic range (HDR) shooting in which a plurality of images for creating a high dynamic range image are captured, comprising:
   an image capture unit;
   a standard exposure computation unit that computes an HDR standard exposure that is a standard exposure used for high dynamic range shooting, by correcting a standard exposure, which is based on a subject luminance of an image obtained by the image capture unit, toward over-exposure or under-exposure;
   a dynamic range computation unit that computes a scene dynamic range based on first luminance information obtained from an image captured with the HDR standard exposure, and based on second luminance information obtained from an image captured with an exposure, wherein the standard exposure exists between the exposure and the HDR standard exposure; and
   a determination unit that determines an exposure range of a plurality of images for creating a high dynamic range image, based on the scene dynamic range computed by the dynamic range computation unit,
   wherein the first luminance information is obtained before an instruction to begin shooting is given, and
   wherein the second luminance information is obtained after an instruction to begin shooting is given.

2. The image capture apparatus according to claim 1, wherein the dynamic range computation unit performs computation of the dynamic range in response to a shooting start instruction.

3. The image capture apparatus according to claim 1, further comprising:
   a judgment unit that judges a luminance zone to be prioritized in the high dynamic range shooting,
   wherein the standard exposure computation unit computes the HDR standard exposure by correcting the standard exposure toward over-exposure if the luminance zone to be prioritized is a low-luminance zone, and computes the HDR standard exposure by correcting the standard exposure toward under-exposure if the luminance zone to be prioritized is a high luminance zone, and
   the dynamic range computation unit computes the scene dynamic range based on luminance information obtained from an image captured with the HDR standard exposure and based on luminance information obtained from an image captured with an under-exposure relative to the HDR standard exposure if the luminance zone to be prioritized is the low-luminance zone, and computes the scene dynamic range based on luminance information obtained from an image captured with the HDR standard exposure and based on luminance information obtained from an image captured with an over-exposure relative to the HDR standard exposure if the luminance zone to be prioritized is the high-luminance zone.

4. The image capture apparatus according to claim 3, wherein the judgment unit judges the luminance zone to be prioritized according to the type of scene mode set in the image capture apparatus.

5. The image capture apparatus according to claim 3, wherein the judgment unit judges the luminance zone to be prioritized using scene analysis that is based on luminance information of an image obtained by shooting.

6. The image capture apparatus according to claim 5, wherein the judgment unit performs the scene analysis based on a difference in luminance between a central area and a peripheral area of the image.

7. An electronic device comprising an image capture apparatus capable of high dynamic range (HDR) shooting in which a plurality of images for creating a high dynamic range image are captured, the image capture apparatus comprising:
   an image capture unit;
   a standard exposure computation unit that computes an HDR standard exposure that is a standard exposure used for high dynamic range shooting, by correcting a standard exposure, which is based on a subject luminance of an image obtained by the image capture unit, toward over-exposure or under-exposure;
   a dynamic range computation unit that computes a scene dynamic range based on first luminance information obtained from an image captured with the HDR standard exposure, and based on second luminance information obtained from an image captured with an exposure, wherein the standard exposure exists between the exposure and the HDR standard exposure; and
   a determination unit that determines an exposure range of a plurality of images for creating a high dynamic range image, based on the scene dynamic range computed by the dynamic range computation unit,
   wherein the first luminance information is obtained before an instruction to begin shooting is given, and wherein the second luminance information is obtained after an instruction to begin shooting is given.

8. An image capture apparatus that performs shooting of a plurality of images for creating a composite image, comprising:
an image capture unit;
an exposure computation unit that computes a first exposure based on a subject luminance of an image obtained by the image capture unit;
a luminance distribution information computation unit that computes scene luminance distribution information based on first luminance information obtained from an image captured with the first exposure, and based on second luminance information obtained from an image captured with a second exposure that is different from the first exposure; and
a determination unit that determines an exposure range of a plurality of images for creating a composite image, based on the scene luminance distribution information,
wherein the first luminance information is obtained before an instruction to begin shooting is given, and
wherein the second luminance information is obtained after an instruction to begin shooting is given.

9. The image capture apparatus according to claim 8, further comprising:
a judgment unit that judges a luminance zone to prioritize in shooting of a plurality of images for creating a composite image,
wherein the exposure computation unit computes the first exposure according to the luminance zone to be prioritized.

10. The image capture apparatus according to claim 9, wherein the judgment unit judges the luminance zone to be prioritized based on the type of scene mode set in the image capture apparatus.

11. The image capture apparatus according to claim 9, wherein the judgment unit judges the luminance zone to be prioritized using scene analysis that is based on luminance information of an image captured by shooting.

12. The image capture apparatus according to claim 11, wherein the judgment unit performs the scene analysis based on a difference in luminance between a central area and a peripheral area of the image.

13. An electronic device comprising an image capture apparatus that performs shooting of a plurality of images for creating a composite image, the image capture apparatus comprising:
an image capture unit;
an exposure computation unit that computes a first exposure based on a subject luminance of an image obtained by the image capture unit;
a luminance distribution information computation unit that computes scene luminance distribution information based on first luminance information obtained from an image captured with the first exposure, and based on second luminance information obtained from an image captured with second exposure that is different from the first exposure; and
a determination unit that determines an exposure range of a plurality of images for creating a composite image, based on the scene luminance distribution information,
wherein the first luminance information is obtained before an instruction to begin shooting is given, and
wherein the second luminance information is obtained after an instruction to begin shooting is given.

14. A method of controlling an image capture apparatus that has an image sensor and is capable of high dynamic range (HDR) shooting in which a plurality of images for creating a high dynamic range image are captured, the method comprising:
computing an HDR standard exposure that is a standard exposure used for high dynamic range shooting, by correcting a standard exposure, which is based on a subject luminance of an image obtained by the image sensor, toward over-exposure or under-exposure;
computing a scene dynamic range based on first luminance information obtained from an image captured with the HDR standard exposure, and based on second luminance information obtained from an image captured with an exposure, wherein the standard exposure exists between the exposure and the HDR standard exposure; and
determining an exposure range of a plurality of images for creating a high dynamic range image based on the scene dynamic range,
wherein the first luminance information is obtained before an instruction to begin shooting is given, and
wherein the second luminance information is obtained after an instruction to begin shooting is given.

15. A method of controlling an image capture apparatus that has an image sensor and is capable of capturing a plurality of images for creating a composite image, comprising:
computing a first exposure based on a subject luminance of an image obtained by the image sensor;
computing scene luminance distribution information based on first luminance information obtained from an image captured with the first exposure, and based on second luminance information obtained from an image captures with a second exposure that is different from the first exposure; and
determining an exposure range of a plurality of images for creating a composite image, based on the scene luminance distribution information,
wherein the first luminance information is obtained before an instruction to begin shooting is given, and
wherein the second luminance information is obtained after an instruction to begin shooting is given.

16. A non-transitory computer-readable storage medium that stores program for causing a computer included in an image capture apparatus to execute a control method of an image capture apparatus,
wherein the image capture apparatus has an image sensor and is capable of high dynamic range (HDR) shooting in which a plurality of images for creating a high dynamic range image are captured, and
wherein the method comprises:
computing an HDR standard exposure that is a standard exposure used for high dynamic range shooting, by correcting a standard exposure, which is based on a subject luminance of an image obtained by the image sensor, toward over-exposure or under-exposure;
computing a scene dynamic range based on first luminance information obtained from an image captured with the HDR standard exposure, and based on second luminance information obtained from an image captured with an exposure, wherein the standard exposure exists between the exposure and the HDR standard exposure; and
determining an exposure range of a plurality of images for creating a high dynamic range image based on the scene dynamic range,
wherein the first luminance information is obtained before an instruction to begin shooting is given, and wherein the second luminance information is obtained after an instruction to begin shooting is given.

17. A non-transitory computer-readable storage medium that stores program for causing a computer included in an image capture apparatus to execute a control method of an image capture apparatus,
  wherein the image capture apparatus has an image sensor and is capable of capturing a plurality of images for creating a composite image, and
  wherein the method comprising:
  computing a first exposure based on a subject luminance of an image obtained by the image sensor;
  computing scene luminance distribution information based on first luminance information obtained from an image captured with the first exposure, and based on second luminance information obtained from an image captures with a second exposure that is different from the first exposure; and
  determining an exposure range of a plurality of images for creating a composite image, based on the scene luminance distribution information,
  wherein the first luminance information is obtained before an instruction to begin shooting is given, and
  wherein the second luminance information is obtained after an instruction to begin shooting is given.

* * * * *